United States Patent [19]
Gertel et al.

[11] Patent Number: 5,495,359
[45] Date of Patent: Feb. 27, 1996

[54] VARIABLE SENSITIVITY COMPENSATION NETWORK FOR MACH-ZENDER OPTICAL MODULATOR

[75] Inventors: Eitan Gertel, Lansdale; Mark S. Colyar, Newtown, both of Pa.

[73] Assignee: AEL Industries, Inc., Lansdale, Pa.

[21] Appl. No.: 271,803

[22] Filed: Jul. 7, 1994

[51] Int. Cl.$^6$ .................................................. G02B 6/12
[52] U.S. Cl. ............................. 359/245; 359/276; 385/3
[58] Field of Search ................................ 385/3; 359/245, 359/276, 280

[56] References Cited

U.S. PATENT DOCUMENTS

| | | | |
|---|---|---|---|
| 5,230,028 | 7/1993 | Lin et al. | 385/3 |
| 5,278,923 | 1/1994 | Nazarathy et al. | 385/3 |
| 5,400,417 | 3/1995 | Allie et al. | 385/3 |

*Primary Examiner*—Mark Hellner
*Attorney, Agent, or Firm*—Seidel Gonda Lavorgna & Monaco

[57] ABSTRACT

A variable sensitivity compensation network for a Mach-Zender optical modulator comprising first and second pilot signal sources $f_1$ and $f_2$, a signal coupler for combining the pilot signals with an RF information signal for modulating a bias-controlled Mach-Zender optical modulator, a variable sensitivity feedback loop comprising an optical detector for detecting the pilot signals from the modulator output, a bandpass filter for selecting the sum frequency $f_1$ and $f_2$, a voltage variable attenuator for adjusting the sensitivity of the loop, a logarithmic compression circuit for compressing the $f_1$ and $f_2$ signal level from the variable attenuator, means for measuring the signal level, means for controlling the variable attenuator and means for producing an analog bias signal for controlling the operating point of the Mach-Zender modulator. The measuring and controlling means include a microprocessor.

13 Claims, 3 Drawing Sheets

VARIABLE SENSITIVITY COMPENSATION NETWORK FOR MACH-ZENDER OPTICAL MODULATOR

FIELD OF THE INVENTION

The present invention is related to the field of optical fiber communications technology. The invention is directed to the adaptive control of the bias point of a Mach-Zender optical modulator to maintain its operating bias within the most linear portion of the characteristic transfer function of the modulator.

BACKGROUND OF THE INVENTION

In the field of optical communications, the use of the Mach-Zender optical modulator is well-known. The Mach-Zender optical modulator mixes an RF information-bearing signal with a lightwave carrier by electromagnetic phase interferometry. Upon entering the modulator, the lightwave carrier is typically split into two signals that are coupled into separate waveguides formed in the crystal structure of the modulator. Electrodes are placed in close proximity to the waveguides in the device. An RF information-bearing signal is applied to the electrodes next to one of the waveguides. The propagation of the lightwave carrier through the crystal is affected by electric field variations that the RF signal causes in the propagation characteristic of the waveguide in the area near the electrodes. The electric field causes a local change in the refractive indices around the waveguides, thereby speeding up the propagation of the wave in one path while delaying the other. Thus, the relative phase of the two lightwave signals in the modulator is changed in proportion to the modulating signal applied to the electrodes.

At the output of the modulator the divided carrier signals are recombined. When the two signals having variations in relative phase caused by the RF input are recombined, phase interference occurs. Some of the interference is destructive and some constructive. This produces a modulated lightwave output having amplitude changes in proportion to the modulating RF signal. The modulated carrier can be coupled to a fiber optic medium for transmission over considerable distances.

An optical modulator, like its semiconductor counterparts in RF electronics, is a non-linear device. The typical Mach-Zender optical modulator comprises a lithium niobate (LiNbO$_3$) crystal device having a non-linear modulation characteristic. In order to optimize the quality of the modulated output from an electro-optical modulator, it is desirable to apply a bias control to the device to set its operating point, or bias point, as close as possible to the center of its linear range.

The deviation of the modulator transfer function from the linear response of the ideal modulator causes odd-order harmonic distortion. Because the principle of operation of the Mach-Zender modulator is phase interferometry, the center bias point is very sensitive to temperature, input signal fluctuations, and manufacturing tolerances. If not properly biased, the modulator will generate even-order harmonics and increased odd-order harmonics. Therefore, for the best performance, it is necessary to continuously monitor the output of the modulator and update the bias to ensure the least harmonic distortion and, thus, the maximum dynamic range of the optical communications link. A feedback control providing the bias signal accomplishes this task.

SUMMARY OF THE INVENTION

The present invention is a variable-sensitivity compensation network for a Mach-Zender optical modulator comprising a variable sensitivity feedback loop having an optical detector and a filter, said detector having as its input a small portion of a modulated lightwave from a bias-controlled optical modulator, the output of said detector comprising the input to the filter, said filter being tuned to pass a second-order signal product detected from the modulator output. The network further comprises a variable attenuator for adjusting the loop sensitivity to changes in the second-order signal level received from the filter output, said attenuator having a control input for control by a microprocessor. The network also comprises a circuit for logarithmically compressing the second-order signal connected to the output of the variable attenuator.

The microprocessor also comprises a means for measuring the second-order signal connected to the output of the compression circuit. A digital to analog converter produces a bias control signal from an input from the microprocessor. The bias control signal sets the bias control of the modulator to its most linear operating point.

The optimum bias point for the optical modulator is that at which no second harmonic generation occurs. At the optimum bias point the dynamic range of the modulator is maximized since both the odd and even harmonics are minimized. As the bias signal varies in either the positive or negative direction from the optimum point, the second harmonic signal level increases. The compensation network of the present invention monitors the second harmonic output of the modulator and detects the direction and magnitude of bias point drift faster and more accurately than analog networks. Moreover, the network can change the sensitivity of its detection and measuring components to accomplish very large bias adjustments when necessary (e.g., when a signal initially passes through the modulator), but also measure and compensate for very fine changes in harmonic output.

DESCRIPTION OF THE DRAWINGS

For the purpose of illustrating the invention, there are shown in the drawings forms which are presently preferred; it being understood, however, that this invention is not limited to the precise arrangements and instrumentalities shown.

DESCRIPTION OF THE INVENTION

Figure 1:
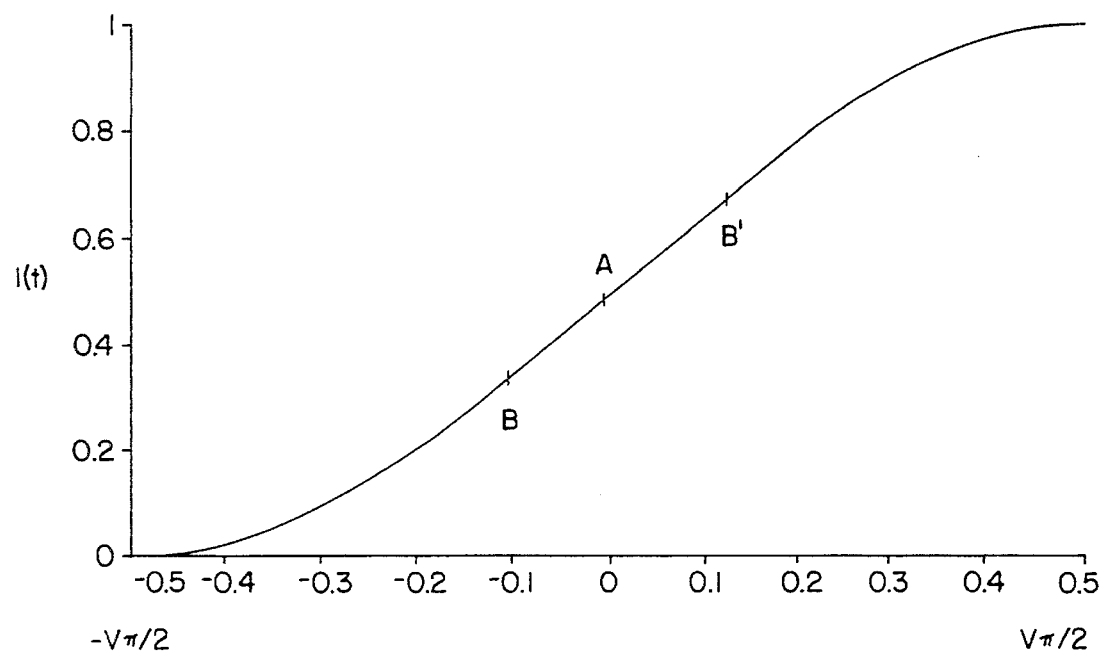
FIG. 1 is a graphical representation of the transfer function of a typical electro-optical modulator.

Referring to the drawings, FIG. 1 is a graphical representation of the non-linear transfer function of a Mach-Zender optical modulator. The most linear range of the modulator is that falling between the points indicated as B and B' in FIG. 1. The object of any bias control, fixed or variable, is to set and hold the operating point of the optical modulator near the center of the linear range of its transfer function, the point indicated as A in FIG. 1.

For the modulator to produce its optimal dynamic signal range without harmonic distortion the operating bias point must be controlled with precision. Since the principle of operation of the Mach-Zender modulator is phase interferometry, the center bias point is very sensitive to temperature, input signal fluctuations, and manufacturing tolerances. By its nature and composition, lithium niobate is temperature sensitive and piezoelectric, which causes variations in the required bias as temperature changes and due to mechanical forces (e.g., vibration) acting on the modulator. If not biased precisely, the modulator will generate even-order harmonics and increased odd-order harmonics. In the present invention, the even-order harmonic, specifically the second harmonic, is used as the feedback error signal for controlling the bias point of the modulator.

Figure 2:
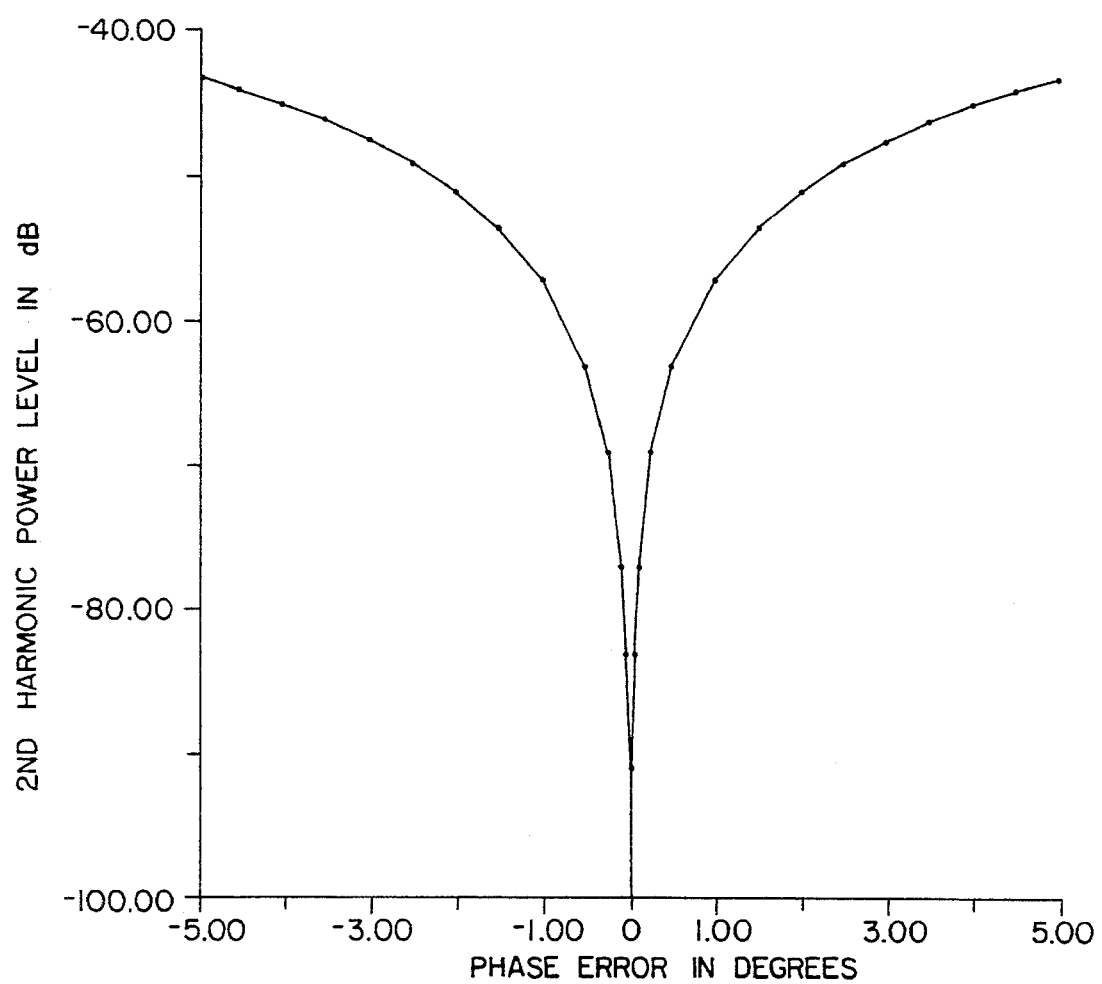
FIG. 2 is a graphical representation of the second harmonic power level produced by a given phase error imparted by the non-linear characteristic of an electro-optical modulator.

FIG. 2 illustrates the level of second harmonic power generated at phase errors on both the positive and negative side of zero degrees phase error. It can be seen that the level of second harmonic power is lowest at zero degrees phase error. It rises quickly when any phase error appears, changing from −100 dB at zero degrees to about −57 dB at only ±1.0 degrees. The 43 dB increase in second harmonic power for only one degree of error indicates how sensitive the optical modulator is to external variables. This offers the opportunity to use the high sensitivity, and the rapid rise in second harmonic power it produces, to control the bias point of the modulator. If the modulator quickly produces a measurable error signal for small increments of phase error, a control signal may be generated and processed to correct the bias point of the modulator back to the optimum operating point.

FIG. 2 also shows how closely the modulator must be controlled to maintain the optimum performance. A phase error of only about 0.2 degrees causes a 30 dB (i.e., a one-thousand fold) increase in second harmonic output around the optimum bias point. Thus, the bias control must be maintained with considerable accuracy to suppress unwanted distortion and maximize dynamic range.

The present invention is a compensation network for controlling the bias point of an optical modulator that incorporates a variable sensitivity adjustment under microprocessor control. The network provides a harmonic output at a predetermined frequency by injecting two pilot signals into the RF information signal that modulates the lightwave carrier in the modulator. The sum frequency of the pilot signals is a second order modulation product whose amplitude is directly related to the accuracy of the bias signal controlling the operating point of the modulator. This frequency is detected, scaled and measured by a microprocessor. The microprocessor not only measures the error signal, but compares it to a history of the error adjustments it has recently made which is stored in its memory. Thus, the compensation network can determine not only how much adjustment is necessary, which is directly proportional to the level of the harmonic content of the error signal, but it can determine the direction of the change necessary from the history of the most recent adjustments. The processor produces a digital equivalent of the bias voltage to be applied to the modulator which, once converted to a voltage and filtered, is applied to the bias input to the modulator.

Figure 3:
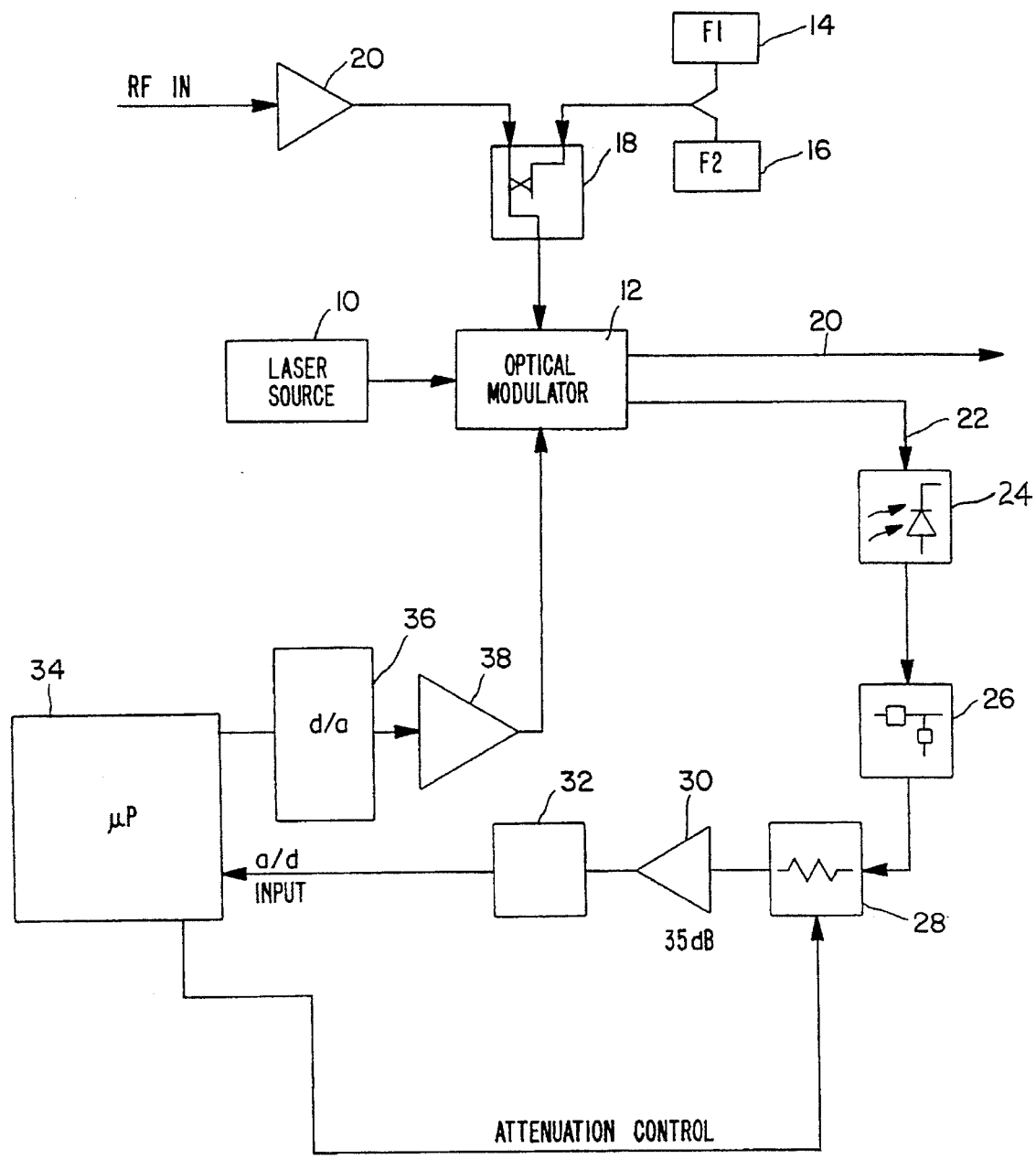
FIG. 3 is a functional diagram of an optical modulator including the variable-sensitivity compensation network of the present invention.

The compensation network of the present invention is depicted in FIG. 3, in which a laser source 10 for producing a lightwave carrier and a Mach-Zender optical modulator 12 are shown. Signal sources 14, 16 emit pilot frequency signals at predetermined frequencies $f_1$ and $f_2$ respectively. The pilot signals are input to a 10 dB signal coupler 18 where they are combined with an RF information-bearing signal, which, in the presently preferred embodiment, has passed through a buffer amplifier 20. The 10 dB coupler is used to minimize loss of RF input signal power.

The combined signal containing both information and pilot frequencies is input to the optical modulator 12. There the information and pilot signals are impressed on the lightwave carrier by phase interferometry in a manner known in the art. At the output of the modulator 12, the major portion of the modulated optical signal 20 is coupled to an optical fiber transmission medium (not shown). A small part of the modulated signal output 22 is diverted to be measured for harmonic content. The diverted signal is input to a photodetector 24 which detects the modulated signals being carried on the lightwave. Among these signals are the predetermined pilot signals which originate in the pilot signal sources 14, 16.

The output of the detector 24 is input to a bandpass filter 26. The filter 26 is tuned to the sum frequency $f_1$ and $f_2$, which is a second order product of the mixing of the pilot frequencies $f_1$ and $f_2$ in the non-linear optical modulator. The amplitude of the sum product $f_1$ and $f_2$ is indicative of the second order harmonic output from the optical modulator 12. When the modulator 12 is correctly biased, the sum product $f_1$ and $f_2$ has a small magnitude. The magnitude increases when the optimum operating point of the modulator 12 shifts, requiring a bias adjustment to compensate for the drift.

The output of the bandpass filter 26, which can be a signal of wide-ranging magnitude, is input to a voltage variable attenuator 28. The variable attenuator is controlled by a microprocessor 34. The purpose of the voltage variable attenuator 28 is to permit the compensation network to adapt to both large and small changes in the operating point of the modulator 12. The attenuator 28 permits measurement of the output of the bandpass filter 26 with maximum sensitivity while keeping the second harmonic signal scaled within the measurable range of the network.

The output of the attenuator passes through a 35 dB amplifier 30 having a log detector 32 on the output. This step accomplishes a logarithmic compression of the signal representing the level of the second harmonic output of the modulator 12 that comes from the voltage variable attenuator 28. The output of the log detector 32 is input to an analog to digital converter which, though shown as an integral element of a microprocessor 34 in FIG. 3, may be a separate component in other embodiments of the invention. The converter changes the scaled and compressed harmonic signal to a digital value suitable for further use in the microprocessor 34.

The microprocessor 34 controls both the compensation network and the operating bias point of the modulator 12. It may, of course, perform other monitoring and control functions common to optical communications systems. However, in environments where the modulator may require very rapid bias adjustments to compensate operating point drift caused by temperature changes and other variables, a dedicated microprocessor may be advisable.

The digitized second harmonic level is analyzed by the microprocessor 34. The processor can determine whether the level has increased or decreased since the last sample was analyzed. Having made this decision, the processor can determine whether the operating point is drifting away from optimum or is approaching it. Because the processor stores the history values of the bias control voltage in its memory, it can determine the most accurate increment of correction to be applied to the bias based on an analysis of many of the most recent samples to ensure that the new correction takes the bias closer to the optimum point. This operation can be done at very high speed and with pinpoint accuracy.

Once the proper increment of correction is determined, the processor 34 either adds or subtracts it depending on the direction of correction determined by the processor, to or from the digital form of the current bias value. The digital representation of the bias voltage is sent to a digital to analog converter 36 for conversion to a voltage. After conditioning in an amplifier/filter 38, the bias control voltage is applied to the bias input of the optical modulator 12. Thus, in the present invention, second harmonic generation by the modulator is detected, scaled, and converted to digital form for analysis. A new bias value is determined, converted to a voltage and applied to the modulator to reduce the second harmonic content of the modulator output.

The microprocessor-controlled variable sensitivity of the compensation network is an important factor in the ability of the present network to effectively suppress harmonic distortion in an optical modulator. It permits the network to process and compensate for large phase errors in the modulator output, such as might occur when the modulator is turned on or is suddenly subjected to a significant temperature change. In this case, the second harmonic level would be large. If the voltage variable attenuator was set to a small attenuation, the harmonic level detected by the compensation network would saturate the log amplifier and analog to digital converter. The microprocessor can immediately recognize this condition and scale the signal in the network by altering the voltage control of the voltage-variable attenuator, raising the attenuation to reduce the level of the signal to be measured. In this way, the harmonic signal can be brought not only within measurable range, but far enough into range that it can exhibit reasonable excursions that can be tracked by the network without saturating the detector.

However, as the harmonic level decreases by successive corrections to the bias, the signal level in the compensation network also decreases. As it does so, the microprocessor can step down the attenuation, thus increasing the sensitivity of the network to progressively smaller second harmonic signals.

Eventually, as the second harmonic level is reduced to nearly the minimum possible, the attenuation in the network should be reduced to zero. At this point, the bias should correspond very nearly to the zero degree phase error operating point, shown in FIG. 2, where the least second harmonic output power is generated. The compensation network is at its most sensitive when the voltage variable attenuation is set to zero dB.

Referring to FIG. 2, very small changes in phase error produce rapid changes in second harmonic output power. With the compensation network at its highest sensitivity, these changes are readily detected by the network and compensated for by the microprocessor. The digitized second harmonic signal is compared to a minimum harmonic power level stored in the microprocessor. If the measured second harmonic power level is lower than the stored minimum, no adjustment is made to the bias of the modulator. If larger than the minimum level, the bias is compensated for by the microprocessor. The direction of the correction depends on the previous measurements of second harmonic power level. The magnitude of the correction is a function of the difference from the minimum level. Larger second harmonic levels require larger correction. Once the magnitude and direction of the bias correction is determined by the microprocessor, it sends a digital representation of the new bias voltage through the digital to analog convertor to the bias input of the modulator.

It is the ability of the microprocessor to change its measurement parameters while adjusting the voltage variable attenuator in the feedback loop that permits this compensation network to be highly effective. The voltage variable attenuator is adjusted by the microprocessor in known increments of attenuation. The microprocessor accordingly changes its measurement scale, and the resulting calculations of necessary bias correction, based on the attenuation in the network, which is under the microprocessor's control. The compensation network of the present invention thus comprises a smart feedback loop that is adapted to a much wider range of harmonic detection and bias compensation than is offered by more conventional feedback networks.

The pilot signals $f_1$ and $f_2$ should both be either above or below the frequency of the RF information-bearing signal modulating the lightwave. Care must be taken when selecting their frequencies so that the inter- modulation products of $f_1$ and $f_2$ (i.e., $f_1+f_2$ and $f_1-f_2$) do not interfere with the information signal. The injection of the two pilot signals and detection of their second order product in the modulator output makes the compensation network 6 dB (about 4 times) more sensitive than conventional feedback networks operating directly on harmonics of the RF input or other modulation products.

The compensation network is adaptable for use in optical communication systems employing battery-operator components. To reduce power consumption, the microprocessor can turn on or off individual components of the optical communication system as necessary. It is possible that bias adjustments may only have to be made at predetermined intervals where environmental conditions change slowly. Though part of the network must remain powered to provide the bias and computer control, other components may be shut down for comparatively long periods. For example, if the actual time required to take a measurement and make a bias correction was only 50 milliseconds, and a bias adjustment need only be made every ten seconds, a power saving by a factor of approximately 200 may be realized for each device that can be powered down. This results in significant energy savings for battery-operated systems.

The present invention may be embodied in other specific forms without departing from the spirit or essential attributes thereof and, accordingly, reference should be made to the appended claims, rather than to the foregoing specification, as indicating the scope of the invention.

We claim:

1. A compensation network for a Mach-Zender optical modulator comprising first and second pilot signal sources emitting first and second pilot signals $f_1$ and $f_2$, respectively, a signal coupler for combining the first and second pilot signals with an RF information-bearing signal and producing a modulating signal having both information and pilot components, said modulating signal being input to a bias-controlled Mach-Zender optical modulator, wherein a bias control fixes an operating point for said modulator, said optical modulator having a modulated lightwave output comprising the information signal and the sum frequency $f_1+f_2$, a variable sensitivity feedback loop comprising an optical detector for detecting the pilot signals from the modulated lightwave output of the optical modulator, the output of said detector being the input to a bandpass filter for passing the sum frequency $f_1+f_2$, said sum frequency comprising the input to a voltage variable attenuator for adjusting the sensitivity of the feedback loop, a logarithmic compression circuit for compressing the $f_1+f_2$ signal level output from the variable attenuator, means for measuring the compressed $f_1+f_2$ signal from the compression circuit, means for controlling the variable attenuator, and means for producing an analog bias signal for controlling the operating point of the optical modulator, said bias signal being input to the modulator.

2. The compensation network of claim 1, wherein the first and second pilot signals $f_1$ and $f_2$ each have a frequency above the RF information signal frequency band and are chosen to minimize intermodulation interference with the information signal.

3. The compensation network of claim 1, wherein the first and second pilot signals $f_1$ and $f_2$ each have a frequency below the RF information signal frequency band and are chosen to minimize intermodulation interference with the information signal.

4. The compensation network of claim 1, wherein the means for measuring the level of the compressed $f_1+f_2$ signal comprises an analog to digital converter for converting the $f_1+f_2$ signal to a digital value, and a microprocessor for measuring the level of $f_1+f_2$ signal from the digital value.

5. The compensation network of claim 4, wherein the means for adjusting the sensitivity of the feedback loop comprises a microprocessor, said microprocessor having a control output for adjusting the voltage-variable attenuator to adjust the magnitude of the signal in the feedback loop based upon the measured level of the $f_1+f_2$ signal.

6. The compensation network of claim 5, wherein the means for producing the bias signal comprises a digital to analog converter.

7. A compensation network for a Mach-Zender optical modulator comprising a variable sensitivity feedback loop comprising an optical detector and a filter, said detector having as its input a small portion of a modulated lightwave from a bias-controlled optical modulator, the output of said detector comprising the input to the filter, said filter being tuned to pass a second-order signal product detected from the modulator output, a variable attenuator for adjusting the loop sensitivity to changes in the second-order signal level received from the filter output, said attenuator having a control input, a means for scaling the second-order signal connected to the output of the variable attenuator, a means for measuring the second-order signal connected to the output of the scaling means, and a means for producing a bias control signal for setting the bias control of the modulator to its most linear operating point.

8. The compensation network of claim 7, wherein the means for controlling the variable attenuator, the means for measuring the second harmonic signal level, and the means for producing the bias signal include a microprocessor, said microprocessor having a control output connected to the control input of the variable attenuator.

9. The compensation network of claim 7, wherein the means for measuring the second harmonic signal further comprises an analog to digital converter.

10. The compensation network of claim 8, wherein the means for producing the bias signal further comprises a digital to analog converter and a filter for generating and conditioning the bias control signal input to the optical modulator.

11. The compensation network of claim 7, wherein the means for scaling the second-order harmonic signal includes a logarithmic compression circuit comprising an amplifier and logarithmic detector.

12. The compensation network of claim 8, wherein the means for measuring the second harmonic signal further comprises an analog to digital converter for converting the analog signal to a digital equivalent for measurement by the microprocessor.

13. The compensation network of claim 7 further comprising first and second signal sources for producing first and second pilot signals $f_1$ and $f_2$, a signal coupler for combining the pilot signals with an information signal and producing a modulating signal having information and pilot signal components, wherein the output of the optical modulator comprises a second order product $f_1+f_2$ that is the second harmonic detected by the variable sensitivity feedback loop.

* * * * *